United States Patent
Taki et al.

(10) Patent No.: US 7,999,654 B2
(45) Date of Patent: Aug. 16, 2011

(54) REMOTE CONTROL METHOD AND SYSTEM, VEHICLE WITH REMOTE CONTROLLABLE FUNCTION, AND CONTROL SERVER

(75) Inventors: Naoki Taki, Okazaki (JP); Atsushi Watanabe, Anjo (JP); Mayumi Otsuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1111 days.

(21) Appl. No.: 11/579,452

(22) PCT Filed: Dec. 22, 2005

(86) PCT No.: PCT/JP2005/024192
§ 371 (c)(1),
(2), (4) Date: Nov. 2, 2006

(87) PCT Pub. No.: WO2006/075533
PCT Pub. Date: Jul. 20, 2006

(65) Prior Publication Data
US 2008/0266051 A1    Oct. 30, 2008

(30) Foreign Application Priority Data
Jan. 11, 2005 (JP) .................. 2005-004369

(51) Int. Cl.
*G05B 19/00* (2006.01)
(52) U.S. Cl. ........ 340/5.64; 341/173; 700/12; 307/10.3; 340/5.2
(58) Field of Classification Search ............... 340/5.1, 340/5.64, 5.2, 5.21–5.28, 5.3, 5.31–5.33, 340/426.15, 426.13, 426.1, 426.17
See application file for complete search history.

(56) References Cited

U.S. PATENT DOCUMENTS

| | | | |
|---|---|---|---|
| 4,054,950 A * | 10/1977 | Boone ........................... | 375/316 |
| 4,236,594 A * | 12/1980 | Ramsperger .................. | 180/167 |
| 4,751,581 A * | 6/1988 | Ishiguro et al. ............... | 348/734 |
| 5,208,756 A * | 5/1993 | Song ............................ | 455/456.3 |
| 5,513,244 A * | 4/1996 | Joao et al. .................... | 455/404.1 |
| 5,579,469 A * | 11/1996 | Pike ............................. | 715/781 |
| 5,600,323 A * | 2/1997 | Boschini ....................... | 341/173 |
| 5,602,535 A * | 2/1997 | Boyles et al. ................ | 340/5.22 |
| 5,808,372 A | 9/1998 | Schwegler et al. | |

(Continued)

FOREIGN PATENT DOCUMENTS

EP    1 288 619 A2    3/2003

(Continued)

OTHER PUBLICATIONS

Jan. 27, 2010 Office Action issued in European Patent Application No. 05 822 277.9.

(Continued)

*Primary Examiner* — Benjamin C. Lee
*Assistant Examiner* — Quang Pham
(74) *Attorney, Agent, or Firm* — Oliff & Berridge, PLC (57) ABSTRACT

A remote control method for remotely controlling the operation of equipment furnished in a vehicle in response to a remote control request generated by a remote controller is provided. The method comprises the steps of (a) acquiring vehicle status information from the vehicle; (b) determining whether to operate particular vehicle equipment designated by the remote control request based on the vehicle status information; and (c) regulating the remote control request based on the determination result representing acceptability of remote-control operation of the requested vehicle equipment.

4 Claims, 7 Drawing Sheets

U.S. PATENT DOCUMENTS

| | | | | |
|---|---|---|---|---|
| 5,883,443 | A * | 3/1999 | Wilson | 307/10.2 |
| 5,922,037 | A * | 7/1999 | Potts | 701/29 |
| 6,014,447 | A * | 1/2000 | Kohnen et al. | 381/86 |
| 6,101,428 | A * | 8/2000 | Snyder | 701/2 |
| 6,243,022 | B1 * | 6/2001 | Furukawa | 340/13.31 |
| 6,308,083 | B2 * | 10/2001 | King | 455/556.1 |
| 6,323,566 | B1 * | 11/2001 | Meier | 307/10.2 |
| 6,359,348 | B1 * | 3/2002 | King | 307/10.1 |
| 6,396,412 | B1 * | 5/2002 | Banas | 340/5.2 |
| 6,512,462 | B1 * | 1/2003 | Robineau | 340/12.13 |
| 6,529,138 | B2 * | 3/2003 | Satoh | 340/12.22 |
| 6,542,071 | B1 * | 4/2003 | Ohtsubo et al. | 340/426.28 |
| 6,587,046 | B2 * | 7/2003 | Joao | 340/539.14 |
| 6,639,511 | B2 * | 10/2003 | Haruna et al. | 340/426.13 |
| 6,654,032 | B1 * | 11/2003 | Zhu et al. | 715/753 |
| 6,744,349 | B1 * | 6/2004 | Asakura et al. | 340/5.62 |
| 6,803,851 | B1 * | 10/2004 | Kramer et al. | 340/5.61 |
| 6,885,285 | B2 * | 4/2005 | Losey | 340/5.72 |
| 6,906,612 | B2 * | 6/2005 | Ghabra et al. | 340/5.61 |
| 6,924,735 | B2 * | 8/2005 | Ueda et al. | 340/426.28 |
| 6,937,138 | B2 * | 8/2005 | Underdahl | 340/5.64 |
| 6,943,681 | B2 * | 9/2005 | Rezvani et al. | 340/506 |
| 7,042,332 | B2 * | 5/2006 | Takamura et al. | 340/5.24 |
| 7,057,493 | B2 * | 6/2006 | Suyama et al. | 340/5.61 |
| 7,069,119 | B2 * | 6/2006 | Ueda et al. | 701/2 |
| 7,135,958 | B1 * | 11/2006 | Suuronen et al. | 340/5.62 |
| 7,167,780 | B2 * | 1/2007 | Hattori | 701/2 |
| 7,245,997 | B2 * | 7/2007 | Kitao et al. | 701/29 |
| 7,268,664 | B2 * | 9/2007 | Tanaka et al. | 340/5.64 |
| 7,277,010 | B2 * | 10/2007 | Joao | 340/539.25 |
| 7,305,284 | B2 * | 12/2007 | Teshima et al. | 701/2 |
| 7,349,722 | B2 * | 3/2008 | Witkowski et al. | 455/569.2 |
| 7,383,056 | B2 * | 6/2008 | Matsubara et al. | 455/521 |
| 7,397,363 | B2 * | 7/2008 | Joao | 340/539.11 |
| 7,403,099 | B2 * | 7/2008 | Kamiya et al. | 340/426.29 |
| 7,439,849 | B2 * | 10/2008 | Kameyama | 340/425.5 |
| 7,609,146 | B2 * | 10/2009 | Tang et al. | 340/5.61 |
| 7,613,551 | B2 * | 11/2009 | Watanabe et al. | 701/2 |
| 7,684,570 | B2 * | 3/2010 | Riggs | 381/86 |
| 2001/0038328 | A1 * | 11/2001 | King et al. | 340/5.64 |
| 2002/0074959 | A1 | 6/2002 | Van Wiemeersch | |
| 2002/0087250 | A1 * | 7/2002 | Pacsai | 701/78 |
| 2003/0016130 | A1 * | 1/2003 | Joao | 340/539 |
| 2003/0043019 | A1 * | 3/2003 | Tanaka et al. | 340/5.64 |
| 2003/0047999 | A1 * | 3/2003 | Chang | 307/10.3 |
| 2003/0057773 | A1 | 3/2003 | Sasaki et al. | |
| 2003/0189481 | A1 * | 10/2003 | Hamid | 340/5.53 |
| 2004/0012483 | A1 * | 1/2004 | Mays | 340/5.71 |
| 2004/0048622 | A1 * | 3/2004 | Witkowski et al. | 455/456.6 |
| 2004/0059483 | A1 * | 3/2004 | Sukakura | 701/36 |
| 2004/0077347 | A1 * | 4/2004 | Lauber et al. | 455/428 |
| 2005/0110619 | A1 * | 5/2005 | Klein | 340/426.15 |
| 2005/0128068 | A1 * | 6/2005 | Winick et al. | 340/517 |
| 2005/0137877 | A1 * | 6/2005 | Oesterling et al. | 704/275 |
| 2005/0143058 | A1 * | 6/2005 | Chang et al. | 455/418 |
| 2005/0164728 | A1 * | 7/2005 | Matsubara et al. | 455/521 |
| 2005/0179323 | A1 * | 8/2005 | Flick | 307/10.6 |
| 2005/0187689 | A1 * | 8/2005 | Westerhoff | 701/49 |
| 2005/0231335 | A1 | 10/2005 | Miller et al. | |
| 2005/0248444 | A1 * | 11/2005 | Joao | 340/426.13 |
| 2006/0145811 | A1 * | 7/2006 | Nantz et al. | 340/5.72 |
| 2007/0165997 | A1 * | 7/2007 | Suzuki et al. | 386/46 |
| 2007/0265744 | A1 * | 11/2007 | Nicolai | 701/35 |
| 2007/0290794 | A1 * | 12/2007 | Teshima et al. | 340/5.64 |
| 2009/0045912 | A1 * | 2/2009 | Sakamoto et al. | 340/5.64 |

FOREIGN PATENT DOCUMENTS

| | | | |
|---|---|---|---|
| JP | 2003-041821 | * | 7/2001 |
| JP | A 2001-241229 | | 9/2001 |
| JP | 2004-102939 | * | 9/2002 |
| JP | 2004-224067 | * | 1/2003 |
| JP | 2003-041821 | * | 2/2003 |
| JP | 2003/041821 | * | 2/2003 |
| JP | A 2003-41821 | | 2/2003 |
| JP | A-2003-296860 | | 10/2003 |
| JP | 2004/102939 | * | 4/2004 |
| JP | 2004-102939 | * | 4/2004 |
| JP | 2004-224067 | * | 8/2004 |
| JP | 2006-063650 | * | 8/2004 |
| JP | 2006-063650 | * | 3/2006 |
| WO | WO 00/13947 | | 3/2000 |
| WO | WO 00/58136 | | 10/2000 |
| WO | WO 2006/033332 A1 | | 3/2006 |

OTHER PUBLICATIONS

Feb. 14, 2011 Grounds of Opposition filed in European Patent No. 1 970 264 B1 (with translation).

* cited by examiner

REMOTE CONTROL METHOD AND SYSTEM, VEHICLE WITH REMOTE CONTROLLABLE FUNCTION, AND CONTROL SERVER

BACKGROUND OF THE INVENTION

The present invention generally relates to a remote control technique and a vehicle with a remote-controllable function, and more particularly, to a technique for operating vehicle equipment remotely in response to a request from a handy or mobile terminal device manipulated by a user of the vehicle.

Conventionally, a remote control system, which includes a control center, a vehicle with prescribed equipment (e.g., power door lock/unlock), and a mobile terminal to be manipulated by a user of the vehicle, is known. See, for example, JP-A 2003-41821. In this system, when a request for activating vehicle equipment is input to the mobile terminal by the user of the vehicle, a request signal is transmitted to the control center. Upon receiving the request signal, the center transmits a driving signal to the vehicle to activate the vehicle equipment provided that a prescribed condition is satisfied. Then the driving signal causes the vehicle equipment to operate. With this system, the vehicle equipment can be operated remotely simply by manipulating the mobile terminal even if the user of the vehicle is away from the vehicle.

The prescribed condition to be satisfied to transmit a driving signal from the control center to the vehicle is, for example, whether permission for operating the vehicle equipment has been acquired in advance from the owner of the vehicle. Accordingly, as long as the permission has been obtained, the center transmits the driving signal in response to every request from the mobile terminal. Some problems arise from this arrangement.

Multiple activation requests conflicting with each other may be made to the same vehicle equipment, or the same driving signal is transmitted repeatedly to the vehicle in response to requests from different mobile terminals. In addition, when the mobile terminal makes a request for operating particular vehicle equipment, that equipment may be actually in use in the vehicle. If, in such situations, a driving signal is transmitted from the center in response to every activation request, vehicle equipment may be operated in an undesirable manner contrary to the intention of a person who is actually using the equipment in the vehicle or a person who has remotely requested a particular operation of that vehicle equipment. What is worse is that the person who is actually using the equipment or the person who has made a remote control request may not recognize that the unwanted operation is occurring.

SUMMARY OF THE INVENTION

The present invention was conceived in view of the above-described problems in the prior art, and the invention provides a remote control system and a vehicle with a device capable of appropriately dealing with the remote-control operations of vehicle equipment. This can be realized by, for example, adjusting or regulating multiple driving requests made to same vehicle equipment based on the current state of that vehicle equipment.

In one aspect of the invention, a remote control method for remotely controlling operation of equipment furnished in a vehicle in response to a remote control request generated by a remote controller is provided. The method includes the steps of:

(a) acquiring vehicle status information from the vehicle;
(b) determining whether to operate particular vehicle equipment designated by the remote control request based on the vehicle status information; and
(c) regulating the remote control request based on the determination result representing acceptability of remote-control operation of the requested vehicle equipment.

In a first preferred example, the remote control method further includes the steps of:
(d) transmitting the remote control request from the remote controller to a control center;
(e) acquiring at the control center the vehicle status information form the vehicle;
(f) determining at the control center whether to operate the vehicle equipment based on whether the vehicle status information satisfies a prescribed condition; and
(g) transmitting a remote control instruction from the control center to the vehicle if the prescribed condition is satisfied.

With this arrangement, the control center makes determination whether to process the current remote control request based on the vehicle status information.

In a second preferred embodiment, the remote control method further includes the steps of:
(d) acquiring at the remote controller the vehicle status information from the vehicle;
(e) determining at the remote controller whether to operate the vehicle equipment based on whether the received vehicle status information satisfies a prescribed condition; and
(f) transmitting the remote control request from the remote controller to the vehicle if the vehicle status information satisfies the prescribed condition.

With this arrangement, the remote controller makes determination whether to transmit the current remote control request to the vehicle.

In a third preferred example, the remote control method of further includes the steps of:
(d) transmitting the remote control request from the remote controller to the vehicle;
(e) detecting at the vehicle a vehicle status;
(f) determining at the vehicle whether to operate the vehicle equipment based on whether the detected vehicle status satisfies a prescribed condition; and
(g) executing the remote control request if the prescribed condition is satisfied.

With this arrangement, the vehicle determines whether to activate the requested vehicle equipment.

In a fourth preferred example, the remote control method further includes the steps of:
(d) acquire at the remote controller first vehicle status information from the vehicle:
(e) determining at the remote controller whether the first vehicle status information satisfies a first condition;
(f) transmitting the remote control request to the vehicle if the first vehicle status information satisfies the first condition;
(g) acquiring at the vehicle second vehicle status information;
(h) determining at the vehicle whether the second vehicle status information satisfies a second condition; and
(i) executing the remote control request if the second condition is satisfied.

With this arrangement, the determination process is split between the remote controller and the vehicle.

In the second aspect of the invention, a remote control system including a remote controller and a vehicle and configured to remotely control vehicle equipment according to a remote control request generated by the remote controller is provided. In this system, (a) the remote controller has a remote control request generation unit configured to generate a remote control request in response to user's manipulation, (b) the vehicle has a vehicle status detection unit configured to detect a local operation state in the vehicle and a prior remote control result with respect to particular vehicle equipment, and (c) at least one of the remote controller and the vehicle has a remote control request determination unit configured to determine whether to activate the particular vehicle equipment according to the remote control request based on at least one of the local operation state and the prior remote control result.

In the third aspect of the invention, a control server used in a remote control system and provided between a vehicle and a remote controller is provided. The control server comprises:
(a) a vehicle status information acquiring unit configured to acquire vehicle status information from the vehicle;
(b) a remote control request determination unit configured to determine whether to activate prescribed equipment furnished in the vehicle based on the vehicle status information when receiving a remote control request from the remote controller; and
(c) a remote control instruction generation unit configured to generated and supply a remote control instruction to the vehicle if the vehicle status information represents that there is no other competitive remote control request with respect to the particular equipment.

In the fourth aspect of the invention, a vehicle with a remote controllable function is provided. The vehicle comprises:
(a) a vehicle status detection unit configured to detect a vehicle status including a local operation state in the vehicle and a prior remote control result;
(b) a remote control request determination unit configured to determine whether to activate prescribed vehicle equipment based on the detected vehicle status when receiving a remote control request generated by a remote controller; and
(c) an actuator configured to actuate the prescribed vehicle equipment if the vehicle status condition satisfies a prescribed condition.

With the above-described arrangements, remote-control operations are appropriately executed through adjustment of multiple competing requests made to the same vehicle equipment.

BRIEF DESCRIPTION OF THE DRAWINGS

Other features and advantages of the present invention will become more apparent from the following detailed description when read in conjunction with the accompanying drawings, in which.

PREFERRED EMBODIMENTS OF THE INVENTION

The preferred embodiments of the present invention are described below with reference to the attached drawings.

First Embodiment

Figure 1:
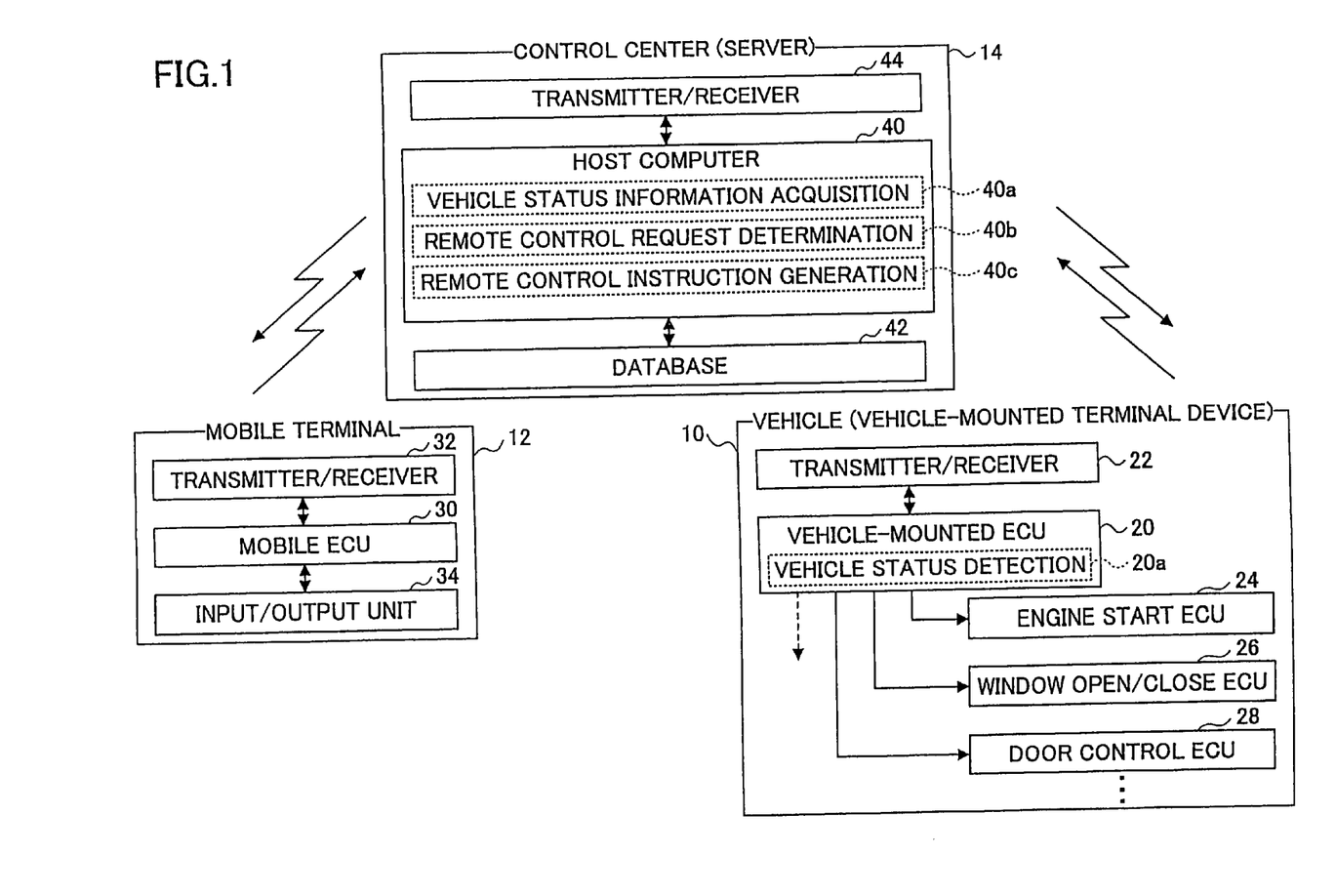
FIG. 1 is a schematic block diagram of a remote control system according to the first embodiment of the invention.

FIG. 1 is a schematic block diagram of a remote control system according to the first embodiment of the invention. The remote control system includes a terminal device 10 mounted in a vehicle (referred to as a "vehicle-mounted terminal device"), a mobile terminal 12 (e.g., a cellular phone, a personal computer, or a PDA) carried by an authorized user of the vehicle (such as a driver or an owner of the vehicle) and functioning as a remote controller, and a control center or server 14 (hereinafter simply referred to as "center 14") that manages information needed for remote-control operations between the mobile terminal 12 and the vehicle-mounted terminal device 10. With the remote control system, equipment furnished in the vehicle (referred to as "vehicle equipment") is operated or activated remotely via the center 14 based on manipulation of the mobile terminal 12. One or more mobile terminals 12 may be used for a vehicle.

The vehicle-mounted terminal device 10 has a vehicle electronic control unit (ECU) 20, which unit implements software programs stored in advance in a memory device, such as a ROM. The vehicle ECU 20 also stores vehicle identification information and the telephone number of the center 14 in a memory (not shown), and has a vehicle status detection unit 20a for detecting the vehicle status (which will be described in detail in conjunction with FIG. 2). The vehicle ECU 20 is connected to a transmitter/receiver 22 to perform wireless communication with the center 14 via a prescribed communication network. The transmitter/receiver 22 transmits information about the vehicle from the vehicle-mounted terminal device 10 to the center 14, and receives information from the center 14 via the communication network. The vehicle ECU 20 supplies data items to be transmitted to the transmitter/receiver 22, and receives data items from the transmitter/receiver 22. The vehicle ECU 20 is connected to various driving control units, including engine start ECU 24, window opening/closing ECU 26, and door-control ECU 28, for controlling vehicle equipment furnished in the vehicle. When the transmitter/receiver 22 receives a vehicle equipment activating instruction from the center 14, the vehicle ECU 20 supplies an activation signal to the engine start ECU 24, the window opening/closing ECU 26, or the door-control ECU 28 as appropriate. The details of the activating instruction supplied from the center 14 are described below.

The engine start ECU 24 is connected to an actuator (not shown), and it turns on the actuator to start the engine when the associated activation signal is supplied from the vehicle ECU 20 and when the ignition switch is turned on to perform starter-on. The window opening/closing ECU 26 is connected to an actuator (not shown) for opening and closing each door window, and it turns on the actuator to open or close the window when the associated activation signal is supplied from the vehicle ECU 20 or when the power-window button is depressed in the vehicle. The door-control ECU 28 is connected to an actuator (not shown) for locking or unlocking each car door, and it locks or unlocks the car door when the associated activation signal is supplied from the vehicle ECU 20 or when door-lock or door-unlock operation is performed in the vehicle.

Next, explanation is made of "remote operations" of vehicle equipment performed in response to a remote control request transmitted from the mobile terminal 12 via the center 14 to the vehicle-mounted terminal device 10, as well as "local operations" performed by a person in or near the vehicle manually or electrically.

In using the vehicle with the vehicle-mounted terminal device 10, a car key carried by the driver may be used, in addition to the mobile terminal 12, to lock or unlock the car door, or to switch the ignition. The car key may be a mechanical key, or alternatively, a wireless key or a smart key that transmits radio signals to activate necessary functions in response to the user's manipulation or in response to request signals from the vehicle.

The mobile terminal 12 has a mobile electronic control unit (ECU) 30. The mobile ECU 30 operates according to the software program stored in advance in a memory device, e.g., a ROM. The mobile ECU 30 also stores identification information of the mobile terminal 12 and the vehicle, the telephone number of the center 14, etc., in a memory.

The mobile ECU 30 is connected to a transmitter/receiver 32 to perform wireless communication with the center 14 via a prescribed communication network. The transmitter/receiver 22 transmits information about the mobile terminal 12 to the center 14, and receives information from the center 14 via the communication network. The mobile ECU supplies data items to be transmitted to the transmitter/receiver 32, and receives data items from the transmitter/receiver 32.

The mobile ECU 30 is connected to the input/output unit 34 that receives input commands manipulated by the user of the vehicle and outputs information to be displayed to the user. The mobile terminal 12 has a Web browser to acquire a Web page of the center 14, through which the mobile terminal 12 can request a remote operation of vehicle equipment. The mobile terminal 12 can browse the files and data stored in an external Web server and can transmit information to the Web server via the communication network, through manipulation of the input/output unit 34.

The center 14 has a high-performance host computer 40 which includes a vehicle status information acquisition unit 40a, a remote control request determination unit 40b, and a remote control instruction generation unit 40c. The host computer 40 operates according to the software program stored in advance in a memory device, such as a ROM. The host computer 40 is connected to a high-capacity database 42, in which user ID information, the e-mail address and the telephone number of the mobile terminal 12, vehicle ID information, and the vehicle telephone number are stored in association with each authorized user.

The host computer 40 is also connected to a transmitter/receiver 44 to perform wireless communication with the vehicle-mounted terminal device 12 and the mobile terminal 10 via a communication network. The transmitter/receiver 44 transmits information of the center 14 to the vehicle-mounted terminal device 10 and the mobile terminal 12, and receives information from the vehicle-mounted terminal device 10 and the mobile terminal 12, via the communication network. The host computer 40 supplies and receives data to and from the transmitter/receiver 44.

Next, explanation is made of the basic operations of the remote control system of the first embodiment. The user of the vehicle starts the Web browser by manipulating the input/output unit 34 of the mobile terminal 12 at a location away from the vehicle to perform a specific operation, such as starting the engine to warm the machine, closing or opening the car window completely or partially, or locking or unlocking the car door. The remote-control locking or window-closing is effective for burglar-proofing when forgetting to close or lock the window and/or the door. The center 14 stores necessary formats required to remotely operate the vehicle equipment in response to the manipulation of the mobile terminal 12.

When a prescribed manipulation is performed by the car user with the Web browser opened, the mobile terminal 12 connects itself to the center 14 via the wireless communication network, and requests the center 14 to transmit a Web page through which remote-control operations are to be performed. The center 14 transmits the Web page to the mobile terminal 12 in response to the request. Thus, the mobile terminal 12 acquires the necessary Web page from the center 14.

The Web page exhibits remote-control items operative by manipulation of the mobile terminal 12. The user can select a desired item by clicking the check box. Based on the status of the check boxes, the mobile terminal 12 determines which remote-control item is currently requested by the user. When the user makes a transmission request after the selection of a certain remote-control item, the mobile terminal 12 transmits a remote-control request to the center 14 to activate vehicle equipment corresponding to the checked item.

Upon receiving the remote-control request from the mobile terminal 12 through the Web page, the center 14 specifies the vehicle equipment on which remote activation is currently requested. The center 14 connects itself to the vehicle-mounted terminal device 10 via the wireless communication network as necessary, and transmits a remote-control instruction to the vehicle-mounted terminal device 10, reporting that a remote-control operation on the particular vehicle equipment is currently requested by the user. Upon receiving the remote-control instruction from the center 14, the vehicle-mounted terminal device 10 identifies the vehicle equipment to be remotely controlled, and activates the equipment as necessary.

Having implemented the remote-control operation requested by the mobile terminal 12, the vehicle-mounted terminal device 10 determines whether the requested operation has been normally completed or terminated without completion, and reports the remote control result to the center 14. If the remote-control operation has not been normally completed, the data of the error operation, in-car video images taken by a camera, or sound captured by a microphone may be reported to the center, together with the determination result, to allow the user of the vehicle to determine the reason. Upon receiving the determination result from the vehicle-mounted terminal device 10, the center 14 reports the determination result to the mobile terminal 12 by e-mail or other suitable means. The mobile terminal 12 displays the determination result on the display panel of the input/output unit 34 or output from the speaker to let the user know the operation result.

In this manner, desired car equipment can be remotely operated through manipulation of the mobile terminal 12 by the user because the remote control request is supplied from the mobile terminal 12 through the center 14 to the vehicle-mounted terminal device 10. The user of the vehicle can remotely activate the vehicle equipment while being somewhere away from the vehicle. Even if the user forgets to operate certain equipment when he/she leaves the car, the equipment can be remotely operated in the desired state through manipulation of the mobile terminal 12.

Two or more mobile terminals 12 may be used for a single vehicle. In this case, competitive remote control requests may be made almost simultaneously by the mobile terminals 12 to activate same equipment (for example a door-lock/unlock actuator). In addition, the vehicle equipment may be being operated locally in the vehicle when the remote control request is generated by the mobile terminal 12. In other words, remote-control operation and local operation may compete against each other, which may cause conflicting operating instructions going to the same equipment.

If the vehicle equipment is activated in response to all the operation requests, the vehicle equipment may begin to operate against the intentions of the user who is remotely controlling or locally operating the vehicle. To overcome this problem, in the situation where multiple activation requests are made to the same vehicle equipment, the requests are adjusted to appropriately perform the requested remote-control operations. This is explained below in conjunction with FIG. 2.

For example, if a second remote control request is generated with respect to certain vehicle equipment before the previous (first) request made to that equipment has been completed in the vehicle, it is desirable not to accept the second request in view of the purpose of the first user. If certain equipment is being operated in the vehicle when a remote-control operation request is made to the same equipment, it is desirable to give priority to the local operation, rather than immediately accepting the remote control request from the mobile terminal 12, in view of the purpose of the user actually working on the equipment in or around the vehicle.

Figure 2:
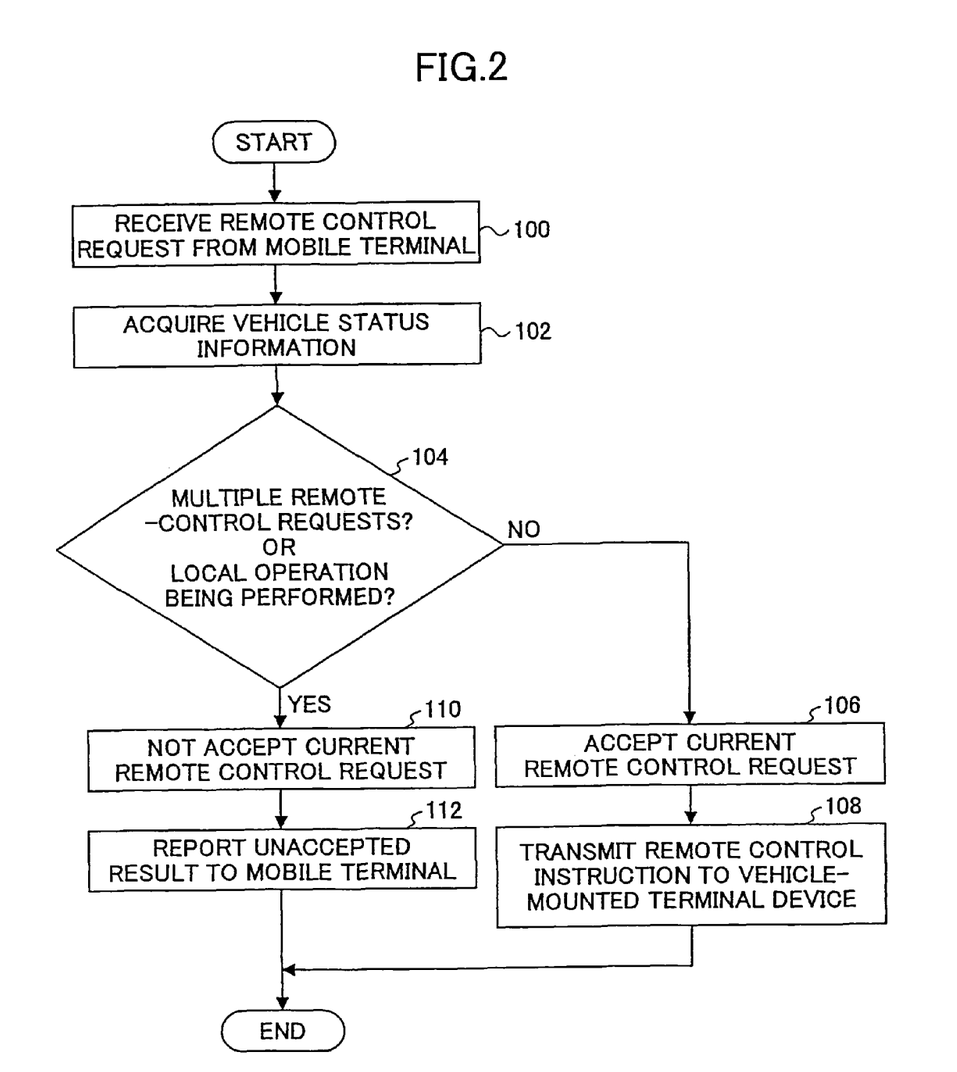
FIG. 2 is a flowchart showing a control routine executed by the control center in the remote control system according to the first embodiment of the invention.

FIG. 2 is a flowchart of a control routine executed by the host computer 40 of the center 14 according to the first embodiment. When the center 14 receives a remote control request for activating certain vehicle equipment from the mobile terminal 12 (step 100), it is determined at the remote control request determination unit 40b whether the prior conditions for performing the requested remote-control operation are satisfied. The prior conditions are, for example, that a local operation is not being performed on the target equipment in the vehicle, and that no other competitive request is made for the same equipment, at the time when the current remote control request is generated at the mobile terminal 12 or received at the center 14.

To this end, the vehicle status information acquisition unit 40a acquires vehicle status information (including local operation information and prior remote control result information as to the requested equipment) to allow the remote control request determination unit 40b to determine whether a local operation is being performed on the requested equipment in the vehicle (step 102). For example, the vehicle status information acquisition unit 40a requests the vehicle-mounted terminal device 10 to transmit the information about the local operation of the requested equipment to the center 12 upon receiving the remote control request from the mobile terminal 12. In this step, the center 14 may request local operation information about all the remotely controllable vehicle equipment. In response to the local operation information request from the center 14, the vehicle status detection unit 20a of the vehicle-mounted terminal device 10 detects whether a local operation is being performed on the requested equipment, which information is transmitted from the transmitter/receiver 22 to the center 14. In this example, the vehicle-mounted terminal device 10 transmits the vehicle status information in response to the vehicle status information request from the center 14, and the center 14 transmits the vehicle status information request in response to the remote control request from the mobile terminal 12.

The center 14 also determines in step 102 whether there is any other competitive remote control request by checking whether a prior remote control result with respect to the same vehicle equipment has been received from the vehicle-mounted terminal device 10. If a similar remote-control operation is requested from one or more mobile terminals 12, it is unnecessary to perform the same operation for the current remote control request. If conflicting operations are requested at similar times, the earliest request should be executed and it is inappropriate to perform the subsequent requests. The previous remote-control operation result is also included in the vehicle status information in the first embodiment.

Then, the remote control request determination unit 40b of the center 14 determines whether to transmit a remote control instruction to the vehicle-mounted terminal device 10 by determining whether a local operation is being performed on the currently requested vehicle equipment based on local operation information (contained in the vehicle status information) supplied from the vehicle-mounted terminal device 10, or by determining whether multiple remote control requests are competing against each other based on presence or absence of previous remote-control operation results with respect to the same vehicle equipment (step S104).

If the center 14 determines that there is no local operation being performed and no other competitive remote control request for the same equipment (NO in S104), the current remote control request is accepted (step 106). In this case, the remote control instruction generation unit 40c generates a remote control instruction, and the center 14 transmits the remote control instruction via a wireless communication network to the vehicle-mounted terminal device 10 so as to indicate the operation to be performed on specific equipment (step 108). Upon receiving the remote control instruction, the vehicle-mounted terminal device 10 activates the vehicle equipment according to the instruction.

If it is determined at the center 14 that a local operation is being performed or another competitive remote control request exists (YES in S104), the current remote control request is not accepted (step 110). In this case, the center 14 reports the unaccepted result to the mobile terminal 12 (step 112). Upon receipt of the unaccepted result from the center, the mobile terminal 12 displays the result on the display panel of the input/output unit 34 or outputs it as sound from the speaker to let the user know the result.

In this example, upon receipt of the remote control request from the mobile terminal 12 requesting activation of specific vehicle equipment, the center 14 transmits a remote control instruction to the vehicle-mounted terminal device 10 provided that there is no local operation being performed on the target equipment in the vehicle, and that there is no other competitive remote control request for that vehicle equipment. On the other hand, if a local operation is being performed on the requested equipment in the vehicle, or if another remote control request is made to the same equipment and the previously requested remote control operation has not been completed, then the center 14 does not transmit a remote control instruction for the currently requested operation to the vehicle-mounted terminal device 10.

In other words, if there is a person who is actually operating certain vehicle equipment in the vehicle or a person who has previously requested remote-control operation of that vehicle equipment using another mobile terminal, the current remote control request generated by the mobile terminal 12 is not accepted, avoiding an overlapping or conflicting operation. Undesirable situations where the currently performed local operation or remote-control operation is suddenly disturbed by a new or interrupting remote control request without perception of the locally operating or remotely controlling person are avoided. By adjusting multiple activation requests on the same vehicle equipment depending on the vehicle status information, the current remote control request generated by the mobile terminal 12 can be appropriately processed.

Since with the system of the first embodiment acceptability of the current remote control request from the mobile terminal 12 is determined at the center 14, the vehicle-mounted terminal device 10 can be simplified and the cost can be reduced. In addition, the number of hops between the determination site and the mobile terminal 12 can be reduced as compared with furnishing the determination function in the vehicle, and therefore, the remote control result (indicating whether the request has been accepted) can be returned to the mobile terminal 12 promptly to inform the user of the mobile terminal 12 of the result.

In addition, the center 14 transmits a request for local operation information to the vehicle-mounted terminal device 10 only when the center 14 receives the remote control request from the mobile terminal 12, and the vehicle-mounted terminal device 10 transmits the local operation information only when it receives the request from the center 14 in the above-described example. This arrangement can reduce the frequency of transmission of local operation information from the vehicle-mounted terminal device 10 to the center 14. Consequently, the traffic between the vehicle and the center 14 and the telecommunication charge can be reduced, as compared with constant transmission. However, of course, the local operation information may be transmitted from the vehicle-mounted terminal device 10 to the center 14 at constant intervals.

In the first embodiment, the center (or the control server) 14 has a vehicle status information acquiring unit 40a that acquires vehicle status information (including local operation information and prior remote control result information) from the vehicle, and a remote control request determination unit 40b that determines whether to transmit a remote control instruction to the vehicle based on the vehicle status information. If the determination result is affirmative, a remote control instruction is generated at the remote control instruction generation unit 40c and transmitted to the vehicle-mounted terminal device 10.

Figure 3:
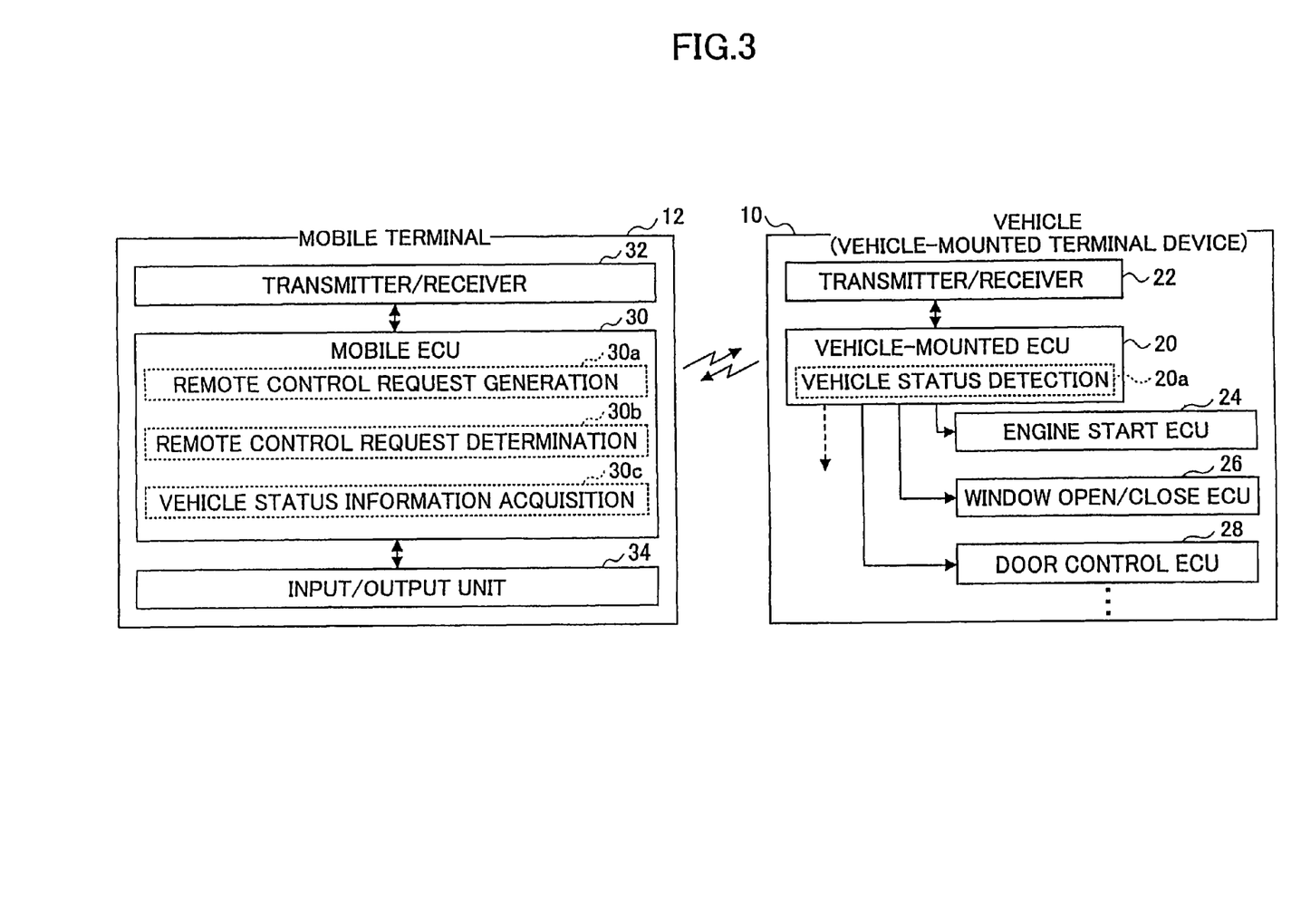
FIG. 3 is a schematic block diagram of a modification of the remote control system of the first embodiment.

FIG. 3 is a schematic block diagram of a modification of the remote control system of the first embodiment, in which modification the center 14 is removed so as to perform direct communication between the mobile terminal 12 and the vehicle-mounted terminal device 10. In this case, when the user manipulates the mobile terminal 12 in a prescribed manner, the vehicle status information acquisition unit 30c generates a request for vehicle status information, which request is transmitted directly to the vehicle-mounted terminal device 10. The vehicle status information acquisition unit 30c also determines whether remote control results of other remote control requests for the same vehicle equipment have been transmitted from the vehicle-mounted terminal device 10. Then, the remote control request determination unit 30b of the mobile terminal 12 determines whether to transmit a remote control request to the vehicle-mounted terminal device 10.

If there is no local operation being performed, and if there is no other competitive remote control request, then the mobile terminal 12 transmits a remote control request generated by the remote control request generation unit 30a. On the other hand, if local operation is being performed in the vehicle, or if a previously requested remote control operation exists and it has not been completed, then the remote control request determination unit 30b withholds transmitting a remote control request, while outputting the determination result through the input/output unit 34.

This modification also has an advantage of appropriate adjustment among multiple remote control requests and a local operation. Since acceptability of remote control operation for certain vehicle equipment is determined at the mobile terminal 12 based on the vehicle status information acquired from the vehicle-mounted terminal device 10, the user can know the remote control result promptly, as in the previously described example.

The local operation information may be transmitted at constant intervals from the vehicle-mounted terminal device 10 to the mobile terminal 12, instead of or in addition to the receipt of the vehicle status information request from the mobile terminal 12.

Second Embodiment

In the second embodiment, acceptability of a remote control request is determined at the vehicle-mounted terminal device 10, instead of at center 14, based on the detected vehicle status information (including local operation information and prior remote control result information). In this case, the vehicle-mounted ECU 20 performs a routine shown in FIG. 4.

Figure 4:
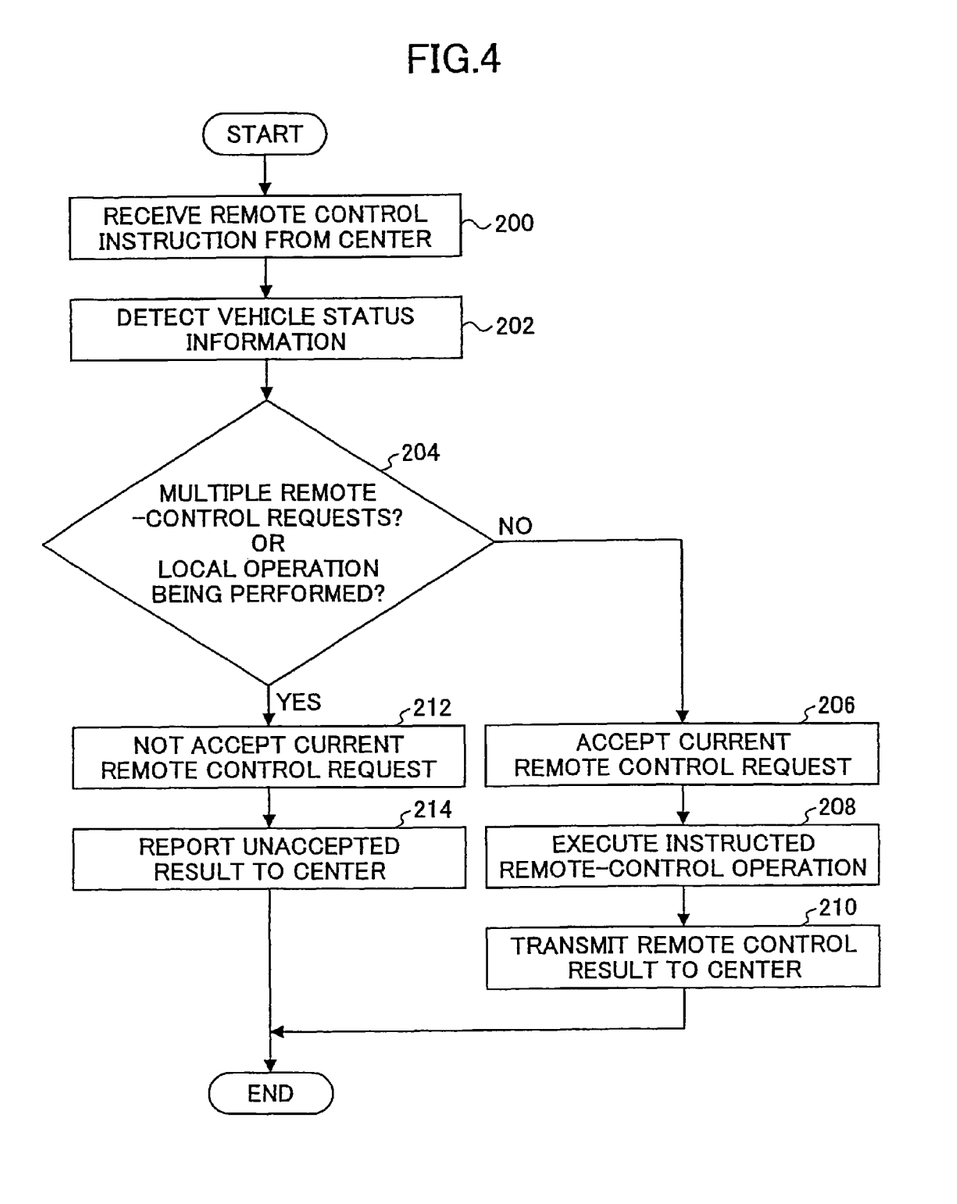
FIG. 4 is a flowchart showing a control routine executed by a vehicle-mounted terminal device in the remote control system according to the second embodiment of the invention.

FIG. 4 is a flowchart of a control routine executed by the vehicle-mounted ECU 20 of the vehicle-mounted terminal device 10 according to the second embodiment. When the center 14 receives a remote control request for activating certain vehicle equipment from the mobile terminal 12, the center transmits a remote control instruction to the vehicle-mounted terminal device 10, and the vehicle-mounted terminal device 10 receives the remote control instruction from the center 14 via a wireless communication network (step 200). The center 14 functions as a gateway that transfers the remote control request from the mobile terminal 12 to the vehicle-mounted terminal device 10.

Upon receiving the remote control instruction from the center 14, the vehicle-mounted terminal device 10 detects a vehicle status including a local operation state and a remote control result of a competitive remote control request with respect to the requested equipment (step 202). Then, the vehicle-mounted terminal device 10 determines whether to execute the requested remote-control operation on the requested vehicle equipment based on the vehicle status detection result (step 204). To be more precise, the vehicle-mounted terminal device 10 determines whether a local operation is being performed at or near the receipt of the remote control instruction, and whether there are any other competitive remote control requests occurring for the same vehicle equipment.

If it is determined that there is no local operation being performed and no other competitive remote control request for the same equipment (NO in S204), the vehicle-mounted terminal device 10 accepts the current remote control request (step 206), and executes the remote control request according to the instruction (step 208). Then the vehicle-mounted terminal device 10 transmits the current remote control result to the center 14 via the wireless communication network (step 210). On the other hands, if it is determined that a local operation or another competitive remote control request exists (YES in S204), the vehicle-mounted terminal device 10 does not accept the current remote control request (step 212). In this case, the vehicle-mounted terminal device 10 reports the unaccepted result to the center 14 (step 214).

When receiving the remote control result or the unaccepted result from the vehicle-mounted terminal device 10, the center 14 reports the result to the mobile terminal 12. Upon receipt of the remote control result or the unaccepted result from the center 14, the mobile terminal 12 displays the result on the display panel of the input/output unit 34 or outputs it as sound from the speaker to let the user know the result.

In this example, upon receipt of the remote control instruction from the center 14, which instruction reflects the remote control request from the mobile terminal 12, the vehicle-mounted terminal device 10 executes the requested operation on the requested equipment provided that there is no local operation being performed on the same equipment, and that there is no other competitive remote control request occurring at the same equipment. On the other hand, if a local operation is being performed on the requested equipment, or if another remote control request is made for the same equipment and the previously requested remote control operation has not been completed, then the vehicle-mounted terminal device 10 does not perform the requested remote-control operation.

In other words, if there is a person who is actually operating certain vehicle equipment in the vehicle or a person who has previously requested a remote-control operation on that vehicle equipment using another mobile terminal, the current remote control request generated by the mobile terminal 12 is not accepted, avoiding an overlapping or conflicting operation. Undesirable situations where the currently performed local operation or remote-control operation is suddenly disturbed by a new or interrupting remote control request without perception of the locally operating or remotely controlling person. By adjusting multiple activation requests on same vehicle equipment depending on the vehicle status information, the current remote control request generated by the mobile terminal 12 can be appropriately processed.

Since with the system of the second embodiment acceptability of the current remote control request from the mobile terminal 12 is determined at the vehicle-mounted terminal device 10, the structure of the center 14 can be simplified. In addition, since the determination site is very close to the vehicle equipment to be operated, the response time taken from the determination to the actual activation can be shortened.

Unlike the first embodiment, it is unnecessary for the system of the second embodiment to report the vehicle status information, including the detected local operation state and prior remote control result information, to the center 14. This arrangement can reduce traffic and telecommunication charges between the vehicle and the center 14, as compared with the first embodiment.

Since the center 14 functions only as a gateway to transfer the remote control request from the mobile terminal 12 to the vehicle-mounted terminal device 10, it is unnecessary for the center 14 to perform data processing according to the conditions of each vehicle. This arrangement is especially advantageous when the structure of the remote-controlled equipment or the prior condition for the remote-control operation varies depending on the manufacturer. Because such a difference does not have to be considered when transmitting a remote control instruction from the center 14 to the vehicle-mounted terminal device 10, a remote control system can be independent of the types and the manufacturers of the vehicles.

In the above-described example, the vehicle-mounted ECU 20 of the vehicle-mounted terminal device 10 has a remote control request determination unit, in addition to the vehicle status detection unit 20a.

Figure 5:
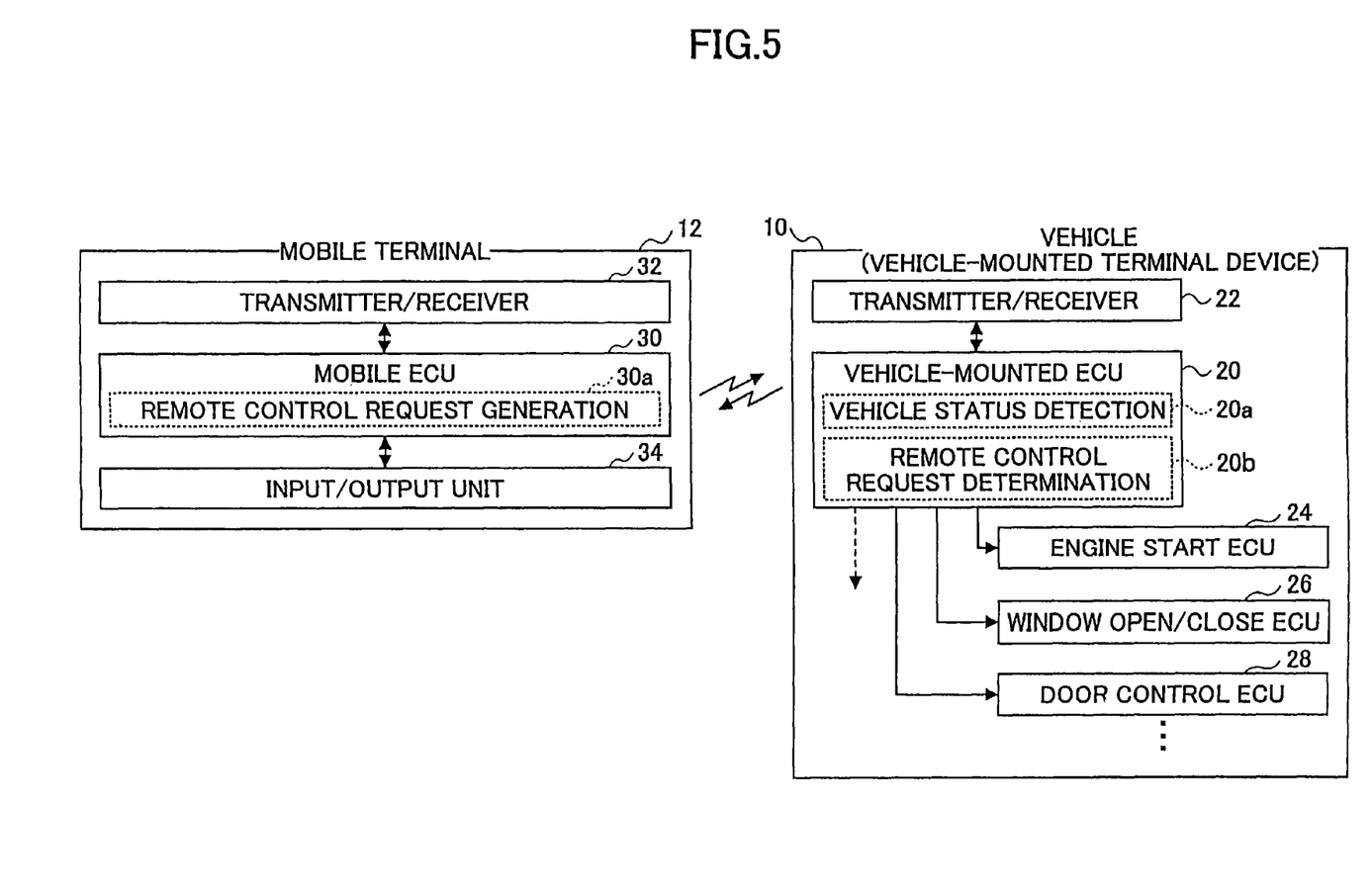
FIG. 5 is a schematic block diagram of a modification of the remote control system of the second embodiment.

FIG. 5 is a schematic block diagram showing a modification of the remote control system of the second embodiment, in which modification the center 14 is removed so as to perform direct communication between the mobile terminal 12 and the vehicle-mounted terminal device 10. In this case, when the user manipulates the mobile terminal 12 in a prescribed manner, the mobile terminal 12 transmits a remote control request generated by the remote control request generation unit 30a to the vehicle-mounted terminal device 10. Upon receiving the remote control request, the vehicle status detection unit 20a of the vehicle-mounted terminal device 10 detects the vehicle status, including the local operation state and the remote control result for previous remote control requests with respect to the same target vehicle equipment. Then, the remote control request determination unit 20b determines whether to carry out the requested remote-control operation based on the detected vehicle status representing whether a local operation is being performed or whether other competitive remote control requests are being processed for the same vehicle equipment. Depending on the determination result, the current remote control request is executed or unaccepted.

This modification also has an advantage of appropriate adjustment among multiple remote control requests and a local operation. Since acceptability of a remote control operation for certain vehicle equipment is determined at the vehicle-mounted terminal device 10 based on the detected vehicle status, the mobile terminal 12 can be simplified without requiring a design change or installation of additional functions.

The local operation information may be transmitted at constant intervals from the vehicle-mounted terminal device 10 to the mobile terminal 12, instead of or in addition to the receipt of the vehicle status information request from the mobile terminal 12.

Third Embodiment

Figure 6:
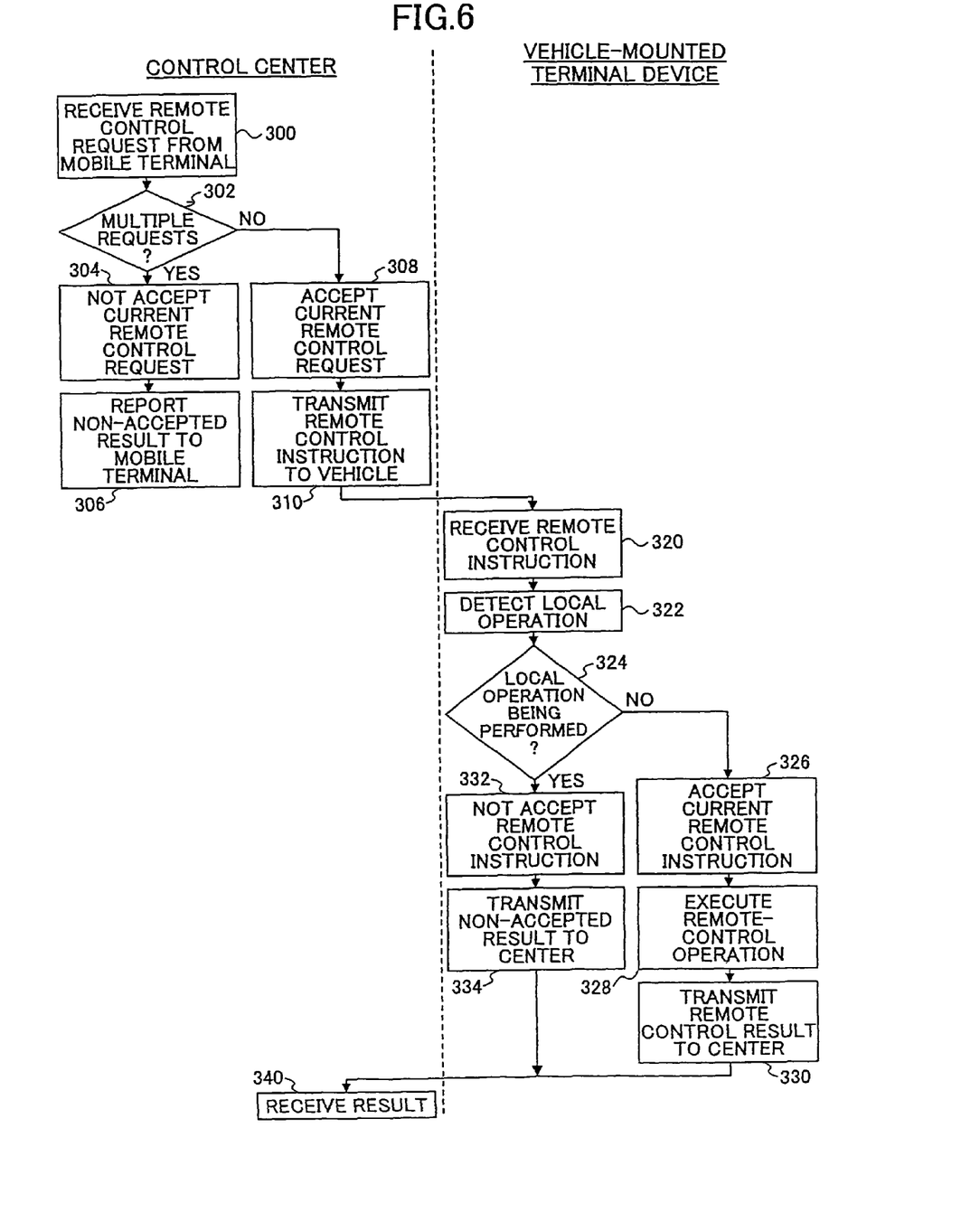
FIG. 6 is a flowchart showing a control routine implemented in the remote control system according to the third embodiment of the invention.

In the first and second embodiments, determination as to acceptability of currently requested remote-control operation is made at a single site, that is, at center 14, vehicle-mounted terminal device 10, or mobile terminal 12, based on local operation information and prior remote control results of other competitive remote control requests. In the third embodiment, determination as to acceptability of a current remote control request based on presence or absence of other competitive remote control requests is performed at the center 14, while remote control acceptability determination based on local operation information is performed at the vehicle-mounted terminal device 10.

FIG. 6 is a flowchart showing a control routine executed in a remote control system according to the third embodiment of the invention. Upon receiving a remote control request with respect to certain vehicle equipment from the mobile terminal 12 (step 300), the center 14 determines whether there is any other competitive remote control request for the same equipment by checking whether the remote control result of a previous remote control request for that vehicle equipment has been received (step 302).

Based on the determination result, the center determines whether to transmit a remote control instruction to the vehicle-mounted terminal device 10. That is, if there is one or more competitive remote control requests (YES in S302), the center does not accept the current remote control request this time (step 304), and reports the unaccepted result to the mobile terminal 12 (step 306). The mobile terminal 12 outputs the result on the display panel or from the speaker to let the user know the result.

On the other hand, if no other competitive remote control request exists (NO in S302), the center 14 accepts the current remote control request (step 308) and transmits a remote control instruction for the currently requested vehicle equipment to the vehicle-mounted terminal device 10 (step 310).

Upon receiving the remote control instruction (step 320), the vehicle-mounted terminal device 10 detects the local operation state (step 322), and determines whether to execute the remote control instruction based on the detection result by determining whether the requested vehicle equipment is being operated (step 324).

If the currently requested equipment is not being used in the vehicle (NO in S324), the vehicle-mounted terminal device 10 accepts the remote control instruction (step 326) and activates the vehicle equipment according to the instruction (step 328). The remote control result is then transmitted from the vehicle-mounted terminal device 10 to the center 14 via the wireless communication network (step 330). On the other hand, if a local operation is being performed on the requested equipment (YES in S324), the vehicle-mounted terminal device 10 does not accept the remote control instruction (step 332) and transmits the unaccepted result to the center 14 (step 334).

The center 14 receives either the remote-control operation result or the request unaccepted result (step 340), and sends an e-mail to the mobile terminal 12 to report the remote-control operation result or the unaccepted result to the user. Upon receiving the e-mail, the mobile terminal 12 displays the result on the display panel or outputs the result as sound from the speaker.

In this manner, in the third embodiment, if there is no other competitive remote control request, the center transmits the remote control instruction to the vehicle-mounted terminal device 10 to activate the vehicle equipment. If there is another competitive request that has not been completed yet, the current remote control request is not accepted so as to prevent contradictory or competing operations of the same vehicle equipment.

When the remote control instruction is transmitted from the center 14 to the vehicle-mounted terminal device 10, the vehicle-mounted terminal device 10 executes or does not execute the instruction depending on the local operation state. If a local operation is not being performed on that equipment, the equipment is activated according to the instruction. If the requested equipment is being operated in the vehicle, the instruction is declined so as to prevent contradictory or competing operations.

Because a current remote control request is not carried out if a local operation is being performed on the requested equipment or a competitive remote control request for that equipment is being processed; sudden interruption or undesired (or contradictory) operation for that equipment can be prevented. Consequently, appropriate remote control of vehicle equipment using one or more mobile terminals 12 is realized through adjustment of multiple requests (including non-acceptance of some remote control requests).

In this embodiment the acceptability determination for the current remote control request is split between two sites, at the center 14 and the vehicle-mounted terminal device 10. When competitive remote control requests are occurring, unaccepted result of the current request can be returned promptly to the mobile terminal 12 because the route from the acceptability determination site, e.g., the center 14, to the mobile terminal 12 is short. If the remote control request is competing against a local operation being performed on the same equipment, the determination result can be acquired promptly because the route from the determination site (vehicle-mounted terminal device 10) and the requested equipment is short. Consequently, the response time taken from the determination to the activation of the equipment can be shortened.

Since the remote control acceptability determination based on the local operation state is performed at the vehicle-mounted terminal device 10, it is unnecessary to transmit the local operation information to the center 14. The traffic and telecommunication charges between the vehicle-mounted terminal device 10 and the center 14 can be reduced, as in the second embodiment.

In the third embodiment, both the center 14 and the vehicle-mounted terminal device 10 have remote control request determination units, but each determination is performed based on a different factor (that is, based on the prior remote control result and the local operation state, respectively).

Figure 7:
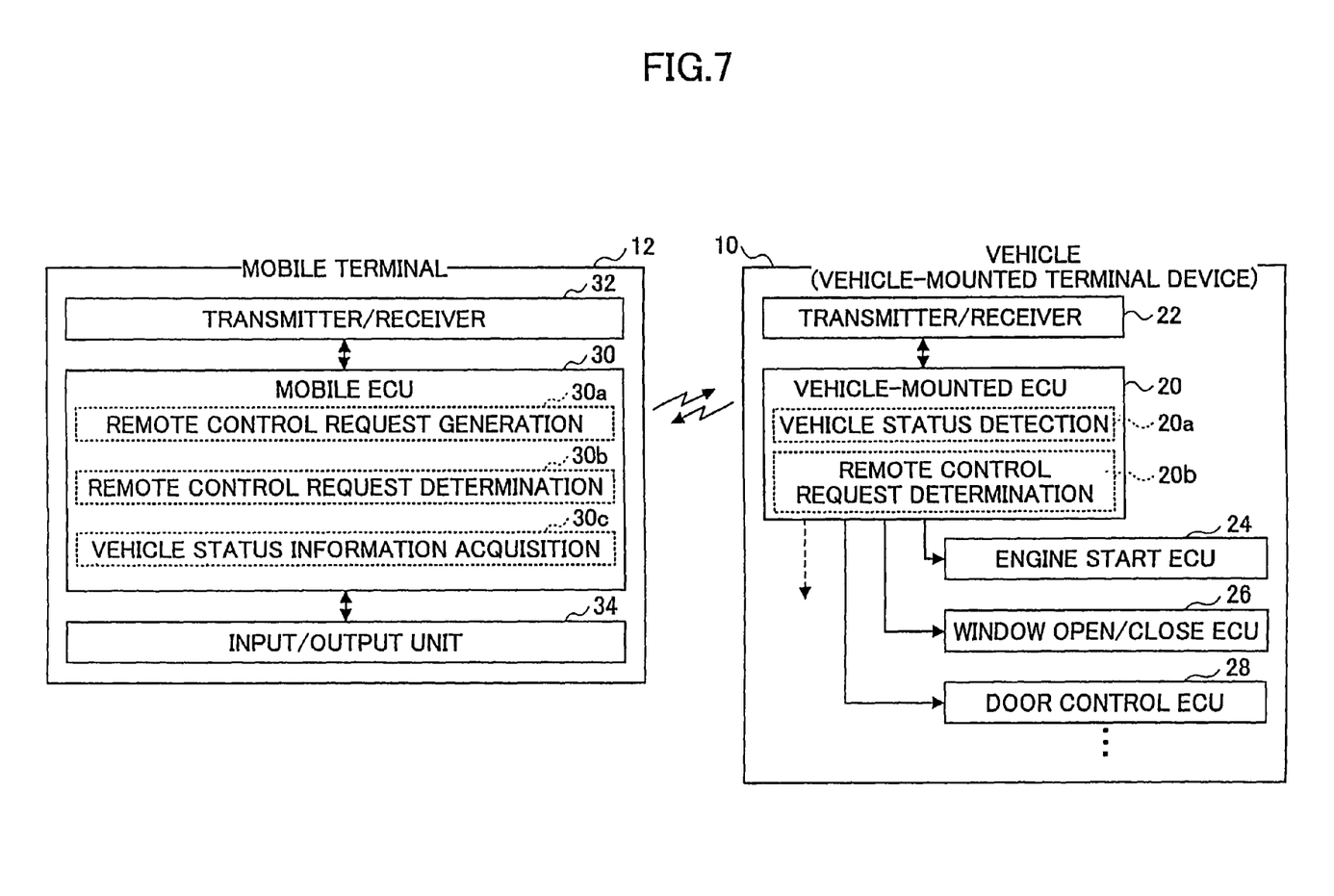
FIG. 7 is a schematic block diagram showing a modification of the third embodiment.

The center 14 may be removed from the remote control system of the third embodiment to allow direct communication between the mobile terminal 12 and the vehicle-mounted terminal device 10, as in the first and second embodiments.

FIG. 7 is a schematic block diagram of the modification of the third embodiment, in which the mobile terminal 12 and the vehicle-mounted terminal device 10 have remote control request determination units 30*b* and 20*b*, respectively. These determination units 30*b* and 20*b* independently perform remote control acceptability determination based on different factors, that is, the existence of competitive remote control requests and the local operation state, respectively.

To be more precise, upon an input of a remote control request to the mobile terminal 12 by the user, the mobile terminal 12 determines whether to transmit the remote control request to the vehicle-mounted terminal device 10 by determining at the determination unit 30*b* whether there is any other competitive remote control request (or by determining whether a remote control result of a competitive request on the same vehicle equipment has been transmitted from the vehicle-mounted terminal device 10) based on the prior remote control result acquired at the vehicle status information acquiring unit 30*c*. If there is no other competitive remote control request, the mobile terminal 12 generates a remote control request at the remote control request generation unit 30*a* and transmits the request to the vehicle-mounted terminal device 10. If there is another competitive remote control request not having been completed, the mobile terminal 12 withholds transmitting the remote control request to the vehicle-mounted terminal device 10.

Upon receiving the remote control request from the mobile terminal 12, the vehicle-mounted terminal device 10 detects the local operation state of the requested equipment at the detection unit 20*a*, and determines at the determination unit 20*b* whether to execute the remote control request based on the detection result. If a local operation is not being performed on that equipment, the vehicle-mounted terminal device 10 activates the requested equipment. If a local operation is being performed on that equipment, the vehicle-mounted terminal device 10 does not execute the current remote control request so as to prevent a contradictory or competing operation on the same vehicle equipment.

This modification can also achieve the advantage of appropriate implementation of a remote control operation under the circumstance where multiple operational requests with respect to the same vehicle equipment are occurring (for example, where a driver or a passenger is actually operating the equipment in the vehicle when a user of the mobile terminal is transmitting a remote control request, or where a user of a second mobile terminal has transmitted or is transmitting a remote control request for the same vehicle equipment), as in the previously described arrangement of the third embodiment.

The vehicle equipment to be remotely controlled is not limited to the illustrated examples, namely, the engine start actuator, the window opening/closing actuator, and the door lock/unlock actuator. Other vehicle equipment, such as equipment for opening and closing the car door or the trunk (boot), equipment for opening and closing a sliding roof, equipment for turning on and off lights, or equipment for turning on and off an alarm (such as a horn or a buzzer), may be remotely controlled.

In addition, the remote controller is not limited to a mobile terminal, but may be a public phone or a fixed telephone set if the center 14 exists between the remote controlling device and the vehicle-mounted terminal device 10. In this case, a remote control request for certain vehicle equipment can be generated and transmitted by, for example, inputting prescribed numbers.

The vehicle-mounted terminal device 10 may be attached to a vehicle in a detachable manner, or incorporated in the vehicle.

The invention claimed is:

1. A remote control system including a remote controller and a vehicle which system is configured to remotely control vehicle equipment according to a remote control request generated by the remote controller, wherein:
   the remote controller has a remote control request generation unit configured to generate the remote control request in response to a user's manipulation;
   the vehicle has a vehicle status detection unit configured to detect a local operation state in the vehicle and a prior remote control result with respect to particular vehicle equipment; and
   at least one of the remote controller and the vehicle has a remote control request determination unit configured to determine whether to activate the particular vehicle equipment according to the remote control request based on at least one of the local operation state and the prior remote control result; the system further comprises a control center provided between the remote controller and the vehicle, the control center having:
   a vehicle status information acquiring unit configured to acquire the prior remote control result from the vehicle;
   a determination unit configured to determine whether the prior remote control result satisfies a first condition; and
   a transmitter configured to transmit a remote control instruction to the vehicle if the first condition is satisfied; and
   the remote control request determination unit is provided to the vehicle, and the vehicle determines whether to activate the particular vehicle equipment based on the local operation state upon receiving the remote control instruction from the control center.

2. A remote control system including a remote controller and a vehicle, which system being configured to remotely control vehicle equipment according to a remote control request supplied from the remote controller via a control center to the vehicle through manipulation of a user, wherein:
   the control center has a requesting unit configured to supply a remote control request for activating vehicle equipment to the vehicle when receiving the remote control for activating the vehicle equipment from the remote controller; and
   the vehicle has a determination unit configured, upon receiving the remote control request for activating the vehicle equipment from the control center, to determine to activate said vehicle equipment according to the remote control request if a pre-existing activation of said vehicle equipment according to another remote control request has already been completed or if the pre-existing activation of said vehicle equipment is not being operated in the vehicle, while determining not to activate said vehicle equipment if the pre-existing activation of said vehicle equipment according to said another remote control request has not been completed or if the pre-existing activation of said vehicle equipment is being locally operated in the vehicle.

3. A remote control system including a remote controller and a vehicle, which system being configured to remotely control vehicle equipment according to a remote control request supplied from the remote controller to the vehicle through manipulation of a user, wherein:
   the vehicle has a determination unit configured, upon receiving the remote control request for activating vehicle equipment from the remote controller, to determine to activate said vehicle equipment according to the remote control request if a pre-existing activation of said vehicle equipment according to another remote control request has already been completed or if the pre-existing activation of said vehicle equipment is not being operated in the vehicle, while determining not to activate said vehicle equipment if the pre-existing activation of said vehicle equipment according to said another remote control request has not been completed or if the pre-existing activation of said vehicle equipment is being locally operated in the vehicle.

4. A vehicle with a remote control apparatus far executing an operation on vehicle equipment according to a remote control request supplied from a remote controller through manipulation of a user, wherein the apparatus comprises:
   a determination unit configured, upon receiving a remote control request for activating vehicle equipment from the remote controller, to determine to activate said vehicle equipment according to the remote control request if a pre-existing activation of said vehicle equipment according to another remote control request has already been completed or if the pre-existing activation of said vehicle equipment is not being operated in the vehicle, while determining not to activate said vehicle equipment if the pre-existing activation of said vehicle equipment according to said another remote control request has not been completed or if the pre-existing activation of said vehicle equipment is being locally operated in the vehicle.

* * * * *